United States Patent [19]

Yao

[11] 3,839,327

[45] Oct. 1, 1974

[54] TRINUCLEAR METHINE DYES FOR USE IN ELECTROPHOTOGRAPHIC SYSTEMS

[75] Inventor: Shi-Kuang Yao, Binghamton, N.Y.

[73] Assignee: GAF Corporation, New York, N.Y.

[22] Filed: Mar. 3, 1971

[21] Appl. No.: 120,751

Related U.S. Application Data

[62] Division of Ser. No. 717,986, April 1, 1968, Pat. No. 3,628,951.

[52] U.S. Cl............... 260/240.1, 96/1.5, 96/1.6, 96/1.7, 260/240.2, 260/240.4, 260/298, 260/304, 260/307 D, 260/309.2, 260/326.13 R

[51] Int. Cl............................................ C09b 23/10

[58] Field of Search........... 260/240.1, 240.2, 240.4

[56] References Cited
UNITED STATES PATENTS

| | | | |
|---|---|---|---|
| 2,535,994 | 12/1950 | Thompson | 260/240.1 |
| 3,047,384 | 7/1962 | Jones et al. | 96/1.7 |
| 3,507,649 | 4/1970 | Hensley | 260/240.4 X |
| 3,576,639 | 4/1971 | Jenkins | 96/127 |
| 3,628,951 | 12/1971 | Yao | 96/1.7 |

*Primary Examiner*—John D. Randolph
*Attorney, Agent, or Firm*—Walter C. Kehm; Samson B. Leavitt

[57] ABSTRACT

Trinuclear methine dyes and intermediates therefor, prepared by quaternizing oxonols, converting the quaternary compound to an inner anhydride, and condensing the latter with a heterocyclic compound having a reactive methyl or methylene group to yield a trinuclear methine dye; and use of the resulting dye to sensitize photoconductive zinc oxide for electrophotography.

1 Claim, No Drawings

TRINUCLEAR METHINE DYES FOR USE IN ELECTROPHOTOGRAPHIC SYSTEMS

This application is a divisional of U.S. Pat. application Ser. No. 717,986 filed Apr. 1, 1968 and now patented as U.S. Pat. No. 3,628,951.

This invention relates to novel trinuclear methine dyes, intermediates therefor, a process for their preparation, and their use in sensitizing zinc oxide as a photoconductor in electrophotographic materials.

It was known heretofore that reactive derivatives of 3-alkylrhodanines, substituted in 5-position, by acetanilinomethylene-, anilinomethylene- or ethoxymethylen-radicals (U.S. Pat. Nos. 2,494,031, 2,658,890) could be used as starting materials for preparation of complex salts of bis-rhodanine-methine or oxonol dyes. Moreover, bis-rhodanine-methine dyes have been prepared from 3-alkylrhodanines by reaction with ethylorthoformate or diethoxymethylacetate (U.S. Pat. No. 2,533,206) in a basic condensation medium. Thus, preparation of oxonol or bis-rhodanine-methine dyes is well known in the art.

It is an object of this invention to provide a novel method for preparing quaternary anhydro inner salts from oxonols and to prepare novel trinuclear dyes from the resulting inner salts, as well as to incorporate said dyestuffs as sensitizers for photoconductive zinc oxide in electrophotographic coatings.

In accordance with this invention, an oxonol dye is converted to a quaternary salt, and the latter hydrolyzed to an anhydro inner salt by purification in a polar solvent. The resulting quaternary anhydro inner salt is then condensed with a N-heterocyclic compound having a reactive methyl or methylene group to form a novel class of trinuclear methine dyes. The latter are incorporated as sensitizers in photoconductive zinc oxide coatings for use in electrophotographic materials.

More particularly, in accordance with this invention, an oxonol corresponding to one of the following formulas:

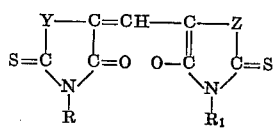

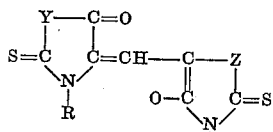

and

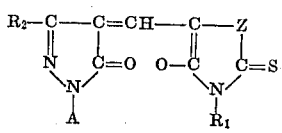

wherein R and R$_1$ are lower saturated or unsaturated alkyl or carboxy alkyl groups or phenyl groups, R$_2$ is a lower alkyl group, A is a phenyl group and Y and Z represent a non-metallic atom (such as N, O, S, Se) necessary to complete a heterocyclic nucleus containing five atoms in the heterocyclic ring, as for example, a rhodanine nucleus, a thiazole-2,4-dione nucleus, a 2-thiooxazolidone nucleus or the like, is treated with a quaternizing reagent such as dimethyl sulfate or methyl or ethyl paratoluene sulfonate. The resulting quaternized complex salt is purified by heating in a polar solvent—especially a lower alcohol such as methyl, ethyl or isopropyl alcohol, preferably diluted to about 50 percent concentration with water. The quaternary compound is hydrolyzed by this treatment to a quaternary anhydro inner salt which separates from the solvent—the salts resulting from the compounds corresponding to the formulas above indicated having the following formulas respectively:

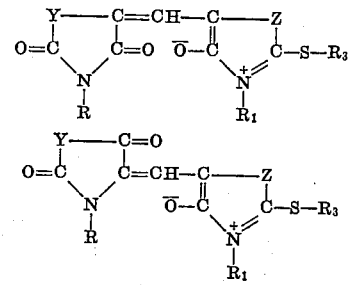

and

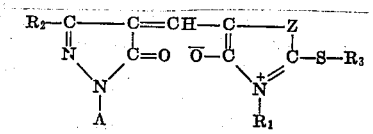

wherein R$_3$ represents a lower alkyl group deriving from the quaternizing reagent, and the other symbols have the same significance indicated above.

The resulting quaternary anhydro inner salts are condensed, by heating in the presence of tertiary nitrogen base such as triethylamine, pyridine or the like, with a heterocyclic compound corresponding to one of the following general formulas:

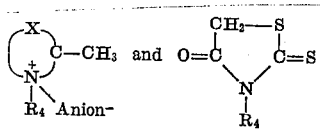

wherein R$_4$ represents a lower alkyl or lower carboxyalkyl group, and X represents the non-metallic atoms necessary to complete a heterocyclic nucleus having five to six carbon atoms in the heterocyclic ring. The resulting trinuclear dyes correspond to the general formulas:

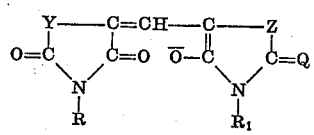

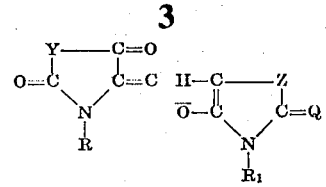

and

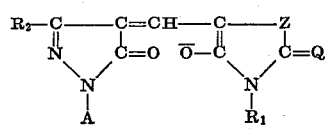

wherein Q represents one of the radicals:

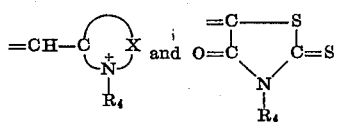

wherein R, $R_1$, $R_2$, $R_4$, A, X, Y and Z have the same significance as indicated hereinabove.

My invention will be illustrated by the following Examples wherein parts and percentages are by weight unless otherwise indicated.

EXAMPLE 1

6.5 grams of the complex inner salt of bis-[5-(3-ethylrhodanine)-methine cyanine] were preheated with 30 ml. of purified chlorobenzene on a constant temperature bath at 131° C. for 10 minutes. 30 ml. of purified dimethyl sulfate were added, and heating continued for 5 minutes at the same temperature. Upon cooling, the mixture was treated three times with ethyl ether. The oily residue was then boiled with 18 ml. isopropanol and then diluted with 18 ml. of water. Upon cooling, the quaternary inner anhydro salt separated in the form of a reddish-brown solid having a melting point of 236° – 237° C. Upon analysis, it was found to correspond to the empirical formula $C_{12}H_{14}N_2O_3S_3$ — the yield being 4.61 g. corresponding to 93.1 percent of theory. Its formula is as follows:

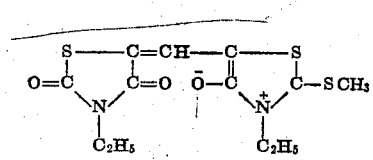

EXAMPLE 2

18.54 g. of the aforesaid anhydro inner salt of Example 1 were added, together with 20.2 g. of 3-carboxyethyl-6-methoxy-2-methyl-benzothiazolium iodide, to 150 ml. of isopropanol. After mixing thoroughly, 34.28 ml. of triethylamine were added. After stirring for 2 minutes, the mixture was heated to boiling for three minutes, and then diluted with three times its volume of water. After neutralizing with 37.7 ml. of glacial acetic acid, the mixture was cooled in ice water for 20 minutes. The dyestuff which separated from the solution was recovered by filtration and boiled three times with methanol. 18.02 g. (59.7 percent of theory) of dyestuff was obtained in the form of greenish crystals melting at 240° – 241° C. with decomposition. On analysis, it was found to correspond to the empirical formula $C_{23}H_{23}N_3O_6S_3 \cdot CH_3OH$. Its formula is as follows:

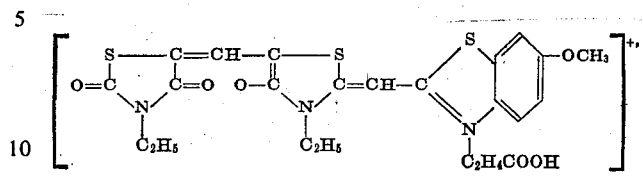

A series of examples were carried out utilizing the procedure of Example 1, but substituting for the oxonol intermediate, a molecularly equivalent amount of an oxonol intermediate corresponding to the formula:

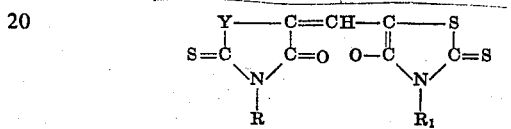

which yielded a series of anhydro inner salts corresponding to the formula:

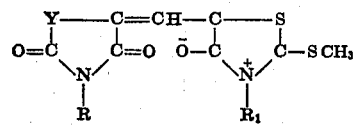

wherein Y, R and $R_1$ correspond to the moieties indicated in the following table:

TABLE 1

| Example No. | Y | R | $R_1$ |
|---|---|---|---|
| 3 | S | methyl | ethyl |
| 4 | S | allyl | ethyl |
| 5 | S | allyl | allyl |
| 6 | S | carboxyethyl | ethyl |
| 7 | S | allyl | methyl |
| 8 | S | phenyl | ethyl |
| 9 | O | ethyl | ethyl |

In addition, the same procedure was employed to convert the oxonol intermediates shown in Examples 10 and 11 to their quaternary anhydro inner salts, the reactions being represented as follows:

EXAMPLE 10

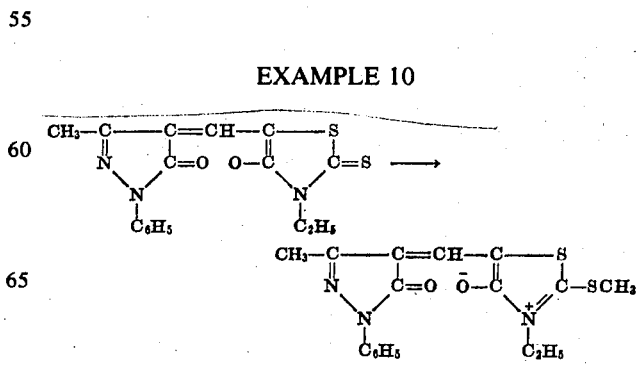

EXAMPLE 11

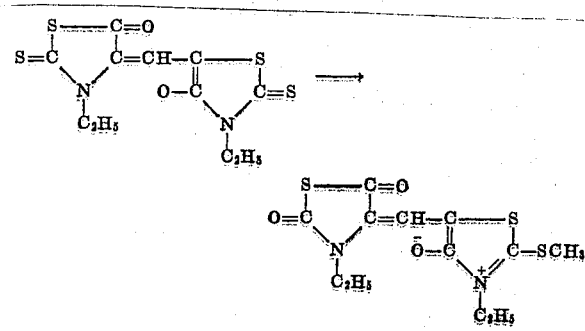

Preparation of trinuclear cyanine dyes from intermediates prepared as illustrated above was effected in a series of examples in accordance with the procedure of Example 2, the condensation reaction being formulated as follows:

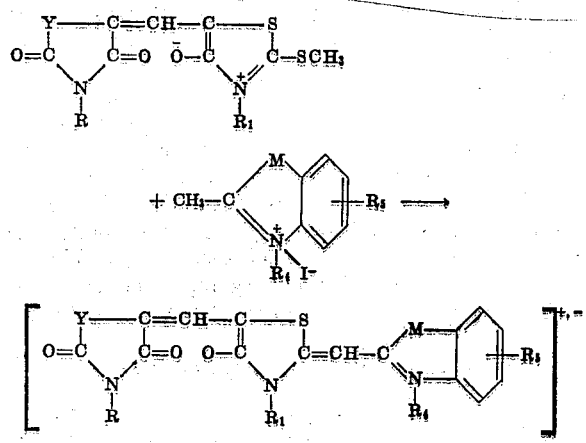

wherein Y, M, R, $R_4$ and $R_5$ signify the moieties shown in the following Table:

TABLE 2

| Example No. | Y | M | R | $R_1$ | $R_5$ | $R_4$ |
|---|---|---|---|---|---|---|
| 12 | S | S | ethyl | ethyl | 6-methoxy | carboxyethyl |
| 13 | S | S | ethyl | ethyl | H | carboxyethyl |
| 14 | S | Se | ethyl | ethyl | 5-methoxy | carboxyethyl |
| 15 | S | S | ethyl | ethyl | 5-methyl-6-methoxy | do. |
| 16 | S | S | ethyl | methyl | 6-methoxy | do. |
| 17 | S | S | ethyl | methyl | H | do. |
| 18 | S | S | ethyl | allyl | 6-methoxy | do. |
| 19 | S | S | ethyl | allyl | H | do. |
| 20 | S | S | allyl | allyl | 6-methoxy | do. |
| 21 | S | S | allyl | allyl | H | do. |
| 22 | S | S | ethyl | carboxyethyl | 6-methoxy | do. |
| 23 | S | S | phenyl | ethyl | 6-methoxy | do. |
| 24 | O | S | ethyl | ethyl | 6-methoxy | do. |

Additional trinuclear dyestuffs were similarly prepared in a further series of examples from intermediate quaternary anhydro salts by condensation in the manner above illustrated, the reaction being formulated as follows:

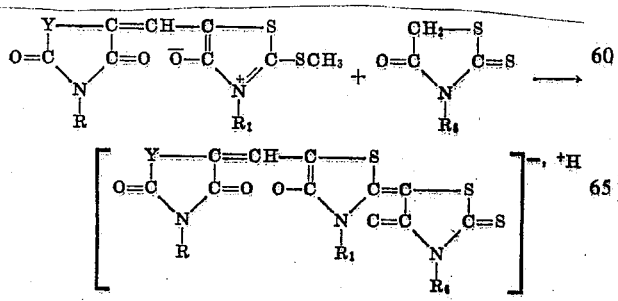

wherein Y, R, $R_1$ and $R_6$ have the significance indicated in the following table:

TABLE 3

| Example No. | Y | R | $R_1$ | $R_8$ |
|---|---|---|---|---|
| 25 | S | ethyl | ethyl | carboxymethyl |
| 26 | S | ethyl | ethyl | carboxyethyl |
| 27 | S | ethyl | ethyl | ethyl |
| 28 | S | ethyl | carboxyethyl | carboxyethyl |

EXAMPLE 29

The intermediate quaternary anhydro inner salt of Example 10 was condensed with 2-methyl-6-methoxy-3-carboxyethyl-benzothiazolium iodide in accordance with the procedure of Example 2 to form a trinuclear methine dye having the following formula:

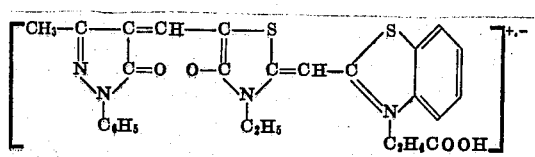

EXAMPLE 30

The intermediate anhydro salt of Example 11 was condensed with 2-methyl-6-methoxy-3-carboxyethyl-benzothiazolium iodide in accordance with the procedure of Example 2 to form a trinuclear methine dye having the formula:

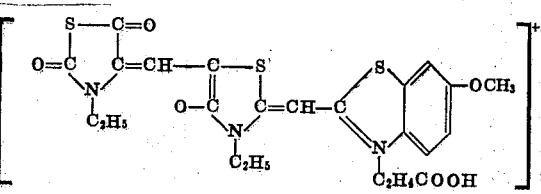

The trinuclear dyestuffs as prepared in accordance with Examples 12 to 30, are excellent sensitizers for zinc oxide in photoconductive insulating layers in electrophotographic materials. In preparing such materials, photoconductive zinc oxide is mixed with a solution in a volatile organic solvent of a resin adapted to serve as an insulating binder, and a solution of the trinuclear sensitizing dye in a compatible solvent such as methanol or ethanol is added. After thorough mixing, the mixture is coated on a paper base, preferably impregnated with a salt such as an alkali or alkaline earth metal halide, or a cationic resin, e.g., of the type described in U.S. Pat. No. 3,011,918, to increase its electrical conductivity. The following example illustrates preparation of an electrophotographic material in accordance with this procedure:

EXAMPLE 31

0.09 g. each of 6 percent by weight xylene solutions of cobalt naphthenate and manganese naphthenate were dissolved in 260 ml. of toluene. 91.8 g. of 50 percent by weight solution in xylene of a resin consisting of a polyglycidyl ether of bis-para-hydroxyphenyl-dimethylmethane, esterified with soyabean fatty acids and dimerized linseed fatty acids, and 18.2 g. of 67 percent by weight solution in xylene low molecular weight polystyrene (mp 75° C.) were added to the solution. 454 g. of photoconductive zinc oxide (St. Joe PC-331) were then added, and the mixture milled until smooth. 20 mg. of the dye of Example 2, dissolved in 20 ml. of methanol were added, and the mixture thoroughly agitated for 30 minutes. It was then coated on a paper base containing as a conductive increasing component, polyvinyl-benzylamine hydrochloride, and dried. The coating amounted to 20 lbs. of solids per 3,000 sq. ft. of surface. As compared with papers prepared instead with cyanine dye sensitizers having the following formulas:

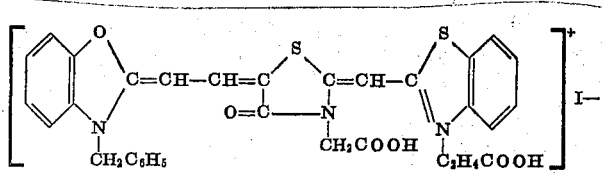

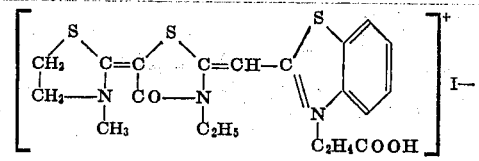

and

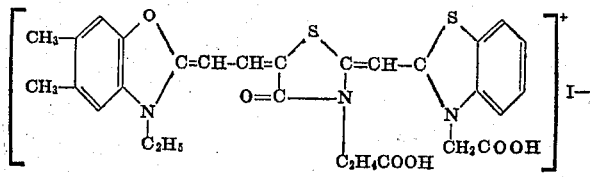

, the products prepared with trinuclear dyes of the present invention, possessed about 15 – 20 percent greater sensitivity. The trinuclear dyestuffs of the present invention were also much more readily soluble in organic solvents than the foregoing cyanine dyes and were about 50 percent better than said cyanine dyes in resistance to bleaching on exposure to light when incorporated in electrophotographic zinc oxide coatings.

For purposes of sensitizing zinc oxide as a photoconductor for electrophotography, the trinuclear dyes of this invention having at least one carboxyalkyl group joined to a heterocyclic nitrogen atom are preferable.

Variations which will be obvious to those skilled in the art can be made in the foregoing examples without departing from the scope or spirit of the invention.

I claim:
1. A trinuclear methine dye having the formula:

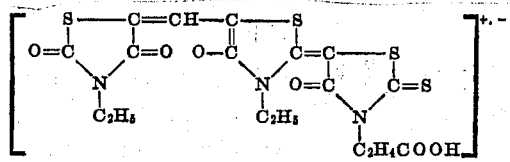

* * * * *